Patented June 14, 1938

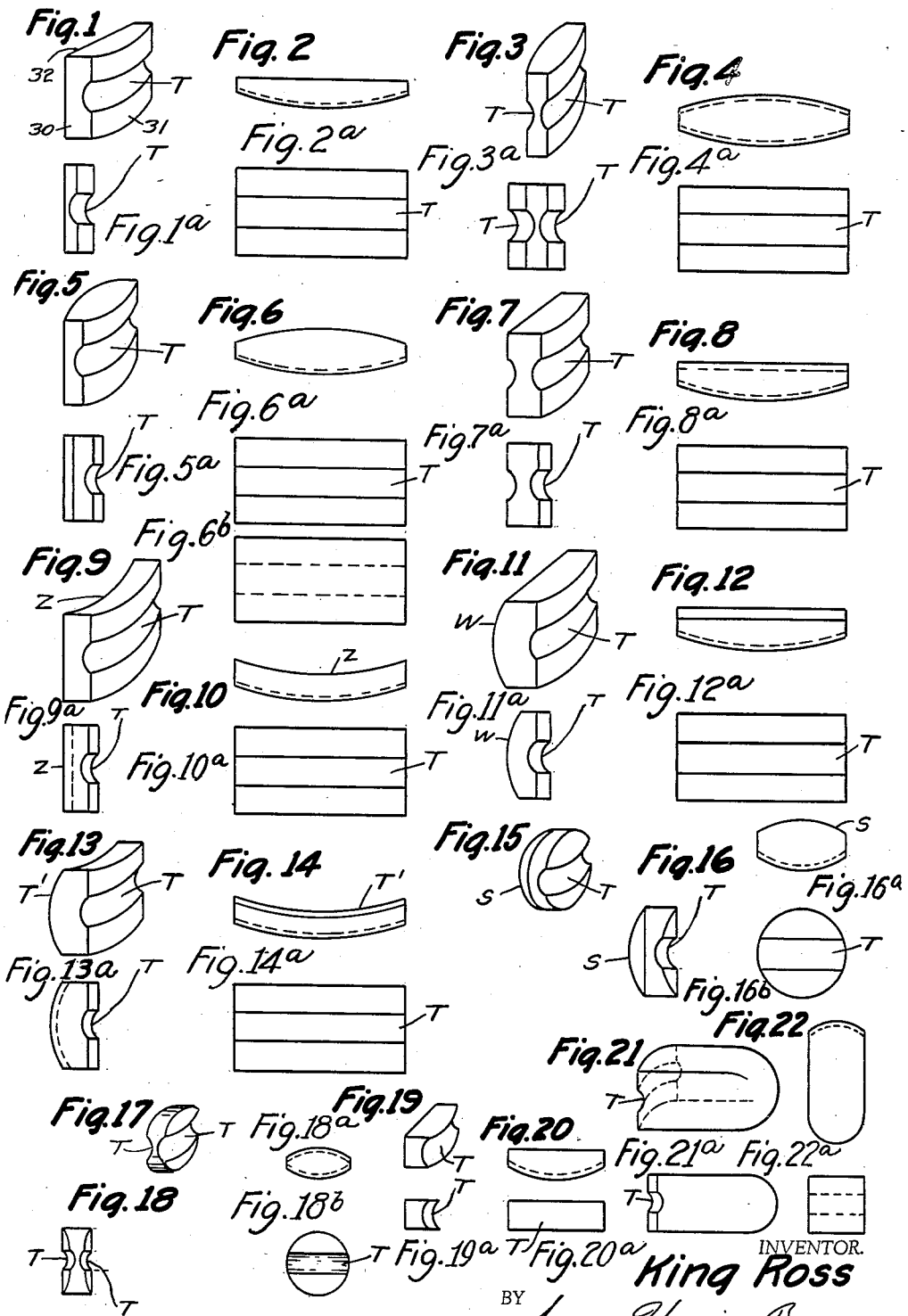

2,120,263

UNITED STATES PATENT OFFICE 2,120,263

SOUND-ON-FILM OPTICAL SYSTEM

King Ross, Jackson Heights, Long Island, N. Y.

Application July 9, 1936, Serial No. 89,745

23 Claims. (Cl. 179—100.3)

This invention relates to recording of sound upon motion picture film and the reproduction of recorded sound therefrom, utilizing a lens system which obviates the use of a mechanical slit or light gate.

The invention is a transparent glass body, upon one face of which is ground and polished a unique toric surface consisting of a concave cylindrical component of relatively small radius, said concave component being ground and polished upon a convex cylindrical surface, the axes of the convex and concave components being in planes which are mutually perpendicular, this toric element being used in combination with an objective or projection lens system.

A condenser lens or lens system may be added in the above combination and might either be a spherical lens; or a convex cylindrical lens, with its axis parallel to the convex component of the toric element.

In this form the invention for recording consists essentially of a varying or variable light source the length of which is relatively long in comparison to the thickness, its length dimension being disposed in a horizontal plane for the purpose of illustration, it being understood that it may be disposed in a vertical plane or at any angle. An imaginary line perpendicular to and bisecting the length dimension of the light source will describe the optical axis of the system upon which all optical elements of the system must be positioned. Beyond said light source, and upon the optical axis, is positioned an unexposed negative film of the type employed in talking motion picture photography, the plane of the sensitized emulsion being disposed perpendicular to the optical axis. Between said moving film and the light source are positioned the principal elements of my invention.

A condenser lens or collective lens is positioned such that the normal to the vertex coincides with the optical axis of the system, this lens being relatively near the light source; beyond this condenser lens, preferably within its principal focal length is positioned the toric element such that the normal to the vertex coincides with the optical axis of the system and bisects the arcs of the convex and concave components of the toric surface, the axis of the concave component being in the horizontal plane described by the optical axis of the system and the length dimension of the light source; the axis of the convex component then being perpendicular to this plane; situated beyond said toric element, and between the toric element and the film, is a projection lens or objective lens also upon the optical axis of the system, the normal to its vertex being coincident with said optical axis, the focal plane of said projection lens or objective lens being coincident with the plane of the sensitized emulsion upon the unexposed negative talking motion picture film.

If, in the above arrangement, a cylindrical condenser lens is used, the normal to its vertex coincides with the optical axis of the system, and bisects the arc of the convex cylinder, the axis of rotation of said cylindrical lens being disposed parallel to the axis of the convex component of the toric element.

The toric element may be positioned with its toric surface facing either the light source or the film without essentially affecting the operation of the invention. The toric surface described is upon only one optical face. Upon the opposite optical face may be ground and polished any optical surface known to the art.

In the above arrangement, the condenser lens may be entirely eliminated; or, if cylindrical, it may be compensated for by combining its power within the convex cylindrical component of the toric element; or if spherical, it may be ground upon the opposed optical face of the toric element, in which case the toric element would be positioned with its toric surface facing the projection or objective lens.

In the above, the variable or varied light source may be variable itself as when acted upon by amplified electrical impulses corresponding to acoustic impulses detected by a microphone as in the so-called variable density method. Or it may be varied by a light valve as in existing systems, using a Kerr cell and Nicol prisms utilizing polarized light, also a variable density method.

Or it may be varied by means of an electromagnetic shutter or a vibrating ribbon as in so-called variable area methods.

One form of the invention for reproducing consists of essentially a light source the length dimension of which is relatively long in comparison to its thickness, its length dimension being disposed in a horizontal plane. As in the recording system, the optical axis approximately bisects the length dimension of the light source and is perpendicular to it. The light source is of approximately steady luminosity, and is preferably of a filament type. Beyond said light source and upon the optical axis of the system, is positioned a moving film of the type used in talking motion picture reproduction, upon which light densities corresponding to sound impulses have been previously recorded, the emulsion plane of the film being disposed perpendicular to the optical axis, and the striations upon said film, which represent sound impulses, being disposed parallel to the length dimension of the light source or filament, the optical axis of the system approximately bisecting the striations upon said film; the motion of the film is in a direction perpendicular to the plane described by the length dimension of the light source and the optical axis.

Beyond said film and upon the optical axis of the system is positioned a photo-electric cell, which is positioned facing the light source. This photocell is connected to its accompanying amplifier and/or amplifiers, and loud speaker system as is commonly known to the art.

Between the film and the light source are positioned the principal elements of my invention, which are the same as hereinbefore described in the system for recording.

The principal object of my invention is to provide a means of obtaining a relatively narrow line of light projected upon the plane of a moving film for the purpose of recording sound thereupon and reproducing sound therefrom.

In existing systems, the limitation set upon the frequency response depends upon the thinness and sharpness of the projected beam upon the film plane. In existing systems which project the image of a narrow slit upon the film plane, this limitation is reached when the slit cannot be made any smaller without producing dispersion of the light, thus producing an unsharp image.

In existing so-called slitless systems, or purely optical systems, this limitation is reached when the optical elements are as fully centered upon the optical axis as possible, and each additional optical surface, or optical element through which the light must be transmitted, tends to introduce additional distortion and loss of light.

In existing optical systems using crossed cylinders, distortion is introduced if their axes are even slightly out of perpendicular. In my invention the concave and convex components are created at one and the same time and each grinding and polishing operation is simultaneous respectively, thus placing their axes mutually perpendicular even when using comparatively rough means of manufacture.

In existing systems using the principle of image reduction in exact proportion to the dimension of a filament, a point is reached wherein the filament must be of such small width or thickness that it sags out and becomes warped due to the heat required to make it luminous, thus creating a warped image.

In existing systems which use a fine mat or limiting slit at the source, a tremendous portion of the total light is lost, thereby reducing the efficiency of the system.

In my invention the light source may be substantially of any proportion other than that required of the beam produced at the film, my invention making this possible by controlling the independent dimensions separately and to this end are controllable from a single optical surface.

In some existing systems use is made of a "light-gate", which is an oblong limiting aperture or diaphragm. I find that this is entirely unnecessary in my invention for stray light as limited by the "light-gate" in existing systems can be eliminated by proper choice of curvatures and by limiting the optical aperture of the concave component of my invention.

As may be seen above, another object of my invention is to provide means of obtaining at a film plane a narrow sharp beam of light on the order of from .00015" to .002" wide by about .1" long.

Another object of my invention is to eliminate the slit in an optical system to record sound upon, and reproduce sound from motion picture film.

Another object of this invention is to control the size and shape of the beam of light produced at and upon the sound track of motion picture film, and upon unexposed negative motion picture film.

Another object of this invention is to provide a means of controlling independently the length and thickness of the image of a light source at a predetermined distance beyond the system.

Another object of this invention is to reduce the number of optical surfaces formerly necessary in similar systems, thus improving the overall efficiency, and gaining in total light transmitted through the system.

Another object of the invention is to reduce the number of optical elements as formerly required in similar systems.

Another object of the invention is to increase the available light received at the film surface, as in recording, or at the light sensitive cell, as in reproducing.

Another object of the invention is to provide means and apparatus to reproduce the sound track upon motion picture film in which the light from the light source may be diminished or reduced, thus saving current, permitting the light source to be smaller to occupy less space, and allowing the entire apparatus to be more adaptable to portability.

A further object is to provide means and apparatus for reproducing the sound track on motion picture film in which the optical system requires a minimum of space longitudinally.

A further object of this invention is to provide a method of recording and reproducing sound upon and from standard 35 mm. film which permits of higher frequencies and wider range of sound, on the order of from 20 cycles to 20,000 cycles per second.

A further object is to provide a means of recording and reproducing sound impulses upon and from narrow gage film such as the 16 mm. type.

A further object is to provide means of recording and reproducing sound signals upon and from film moving at slower rates of speed than standard, 90 feet per minute.

A further object of this invention is to provide means and apparatus to record upon, and reproduce from motion picture film, all the fundamentals and upper harmonics of voices and orchestral instruments for the purpose of reproducing these sounds with highest fidelity and reality.

And a further object of the invention is to provide apparatus for reproducing and recording sound on film, in which the vertical and horizontal adjustments of the light source are not critical.

A further object of this invention is to obviate a delicate adjustment of light source and to allow various lamps to be interchanged without requiring a readjustment.

A further object of this invention is to make unnecessary the use of highly trained technicians or operators to record and reproduce sound on film, thus making the art of sound on film adaptable to the home.

Another object of my invention is to provide an optical element usable in sound on film systems in which the axes of the surfaces necessarily mutually perpendicular, are created simultaneously, wherein these surfaces are upon the same optical face.

A further object of my invention is in an optical system, to provide means of controlling the length and width dimensions of the image of a light source independently from a single optical face.

A further object of my invention is to provide means and apparatus for projecting the image of a filament or other light source upon a field, wherein the proportions of the projected image and the light source are different.

A further object of my invention is to obviate the use of a "light-gate" or limiting aperture or diaphragm in apparatus of the type described.

And a still further object of my invention is in apparatus of a type herein described, to provide means for eliminating stray light, whose reflection from inner surfaces of a housing, upon entering the projection lens would otherwise be detrimental.

Other features and advantages of the invention will appear from the following description, taken in connection with the drawings, wherein:

Figure 1 is a perspective view of a toric element showing a toric surface on one face with a plane surface on the other face.

Figure 2 is a diagrammatic view of the element shown in Figure 1, showing the element developed with a front, plan, and end view.

Figure 3 shows an element similar to that shown in Figure 1 having toric surfaces at both sides.

Figure 4 shows a development of the element shown in Figure 3, showing a front, plan, and end view.

Figure 5 is a view showing a similar element with the face opposite the toric convex cylindrical.

Figure 6 is a diagrammatic view of the element shown in Figure 5 showing a front elevation, rear elevation, plan, and end view.

Figure 7 shows a similar element with a cylindrical concave surface in the face opposite the toric.

Figure 8 shows the development of the element shown in Figure 7 showing a front, plan, and end view.

Figure 9 shows a similar element with the face opposite the toric concave cylindrical.

Figure 10 shows a development of the element shown in Figure 9 showing a front, plan, and end view.

Figure 11 shows a similar element with a convex cylindrical surface on the side opposite the toric.

Figure 12 shows a development of Figure 11 showing a front, plan, and end view.

Figure 13 shows a similar element with the face opposite the toric having a concave face as shown in Figure 9 combined with a convex face as shown in Figure 11.

Figure 14 shows a development of the element shown in Figure 13 showing the front, plan, and end view.

Figure 15 shows a cylindrical element with a toric surface in one side and a convex cylindrical surface on the opposite side.

Figure 16 shows a development of the element shown in Figure 15 showing a front, plan, and end view.

Figure 17 shows a cylindrical element having opposed toric surfaces.

Figure 18 shows a development of the element shown in Figure 17 showing a front, plan, and end view.

Figure 19 shows an element similar to that shown in Figure 1 with the portion above and below the toric surface removed.

Figure 20 shows a development of the element shown in Figure 19 showing a front, plan, and end view.

Figure 21 shows an elongated element with a toric surface in one face and with the opposite end rounded.

Figure 22 shows a development of the element shown in Figure 21 showing a front, plan, and end view.

The rays from source 51 are diverged by the action of the concave cylindrical component of the toric surface, and the apparent position of the image is located at 81 where the dotted lines intersect. The projection or objective lens 53 converges the rays to a focus at the focal plane or film.

Figure 28:
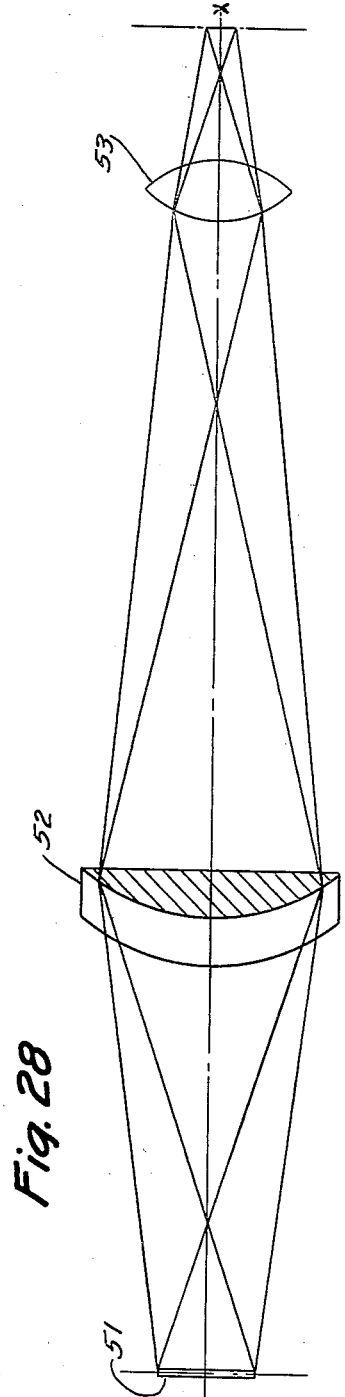

Figure 28 shows a top view of the optical system from the light source filament 51 to the focal plane of projection lens or objective lens; a cross-sectional view of the toric element is shown, through the optical axis and in a horizontal plane, parallel to the optical axis $x$—$x$.

The rays from the filament are converged by the action of the convex component of the toric element; they cross and strike the objective or projection lens and are further converged to a focus at the focal plane or film.

As may be seen in drawing of light ray tracing, only the rays of light which pass essentially through the central portion parallel to its axis are effective, since the diverging light, other than the cone drawn to the objective or projection lens from the position of apparent image, never reaches the projection lens. Therefore, the aperture of the concave component may be calculated such that the extraneous rays are not transmitted by the lens.

Figure 29:
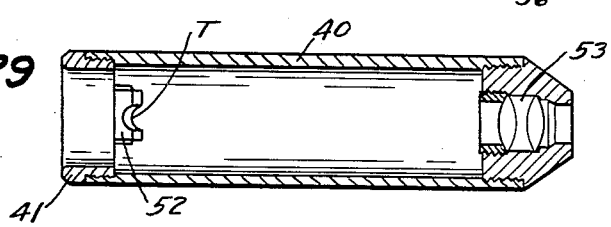
Figure 27:
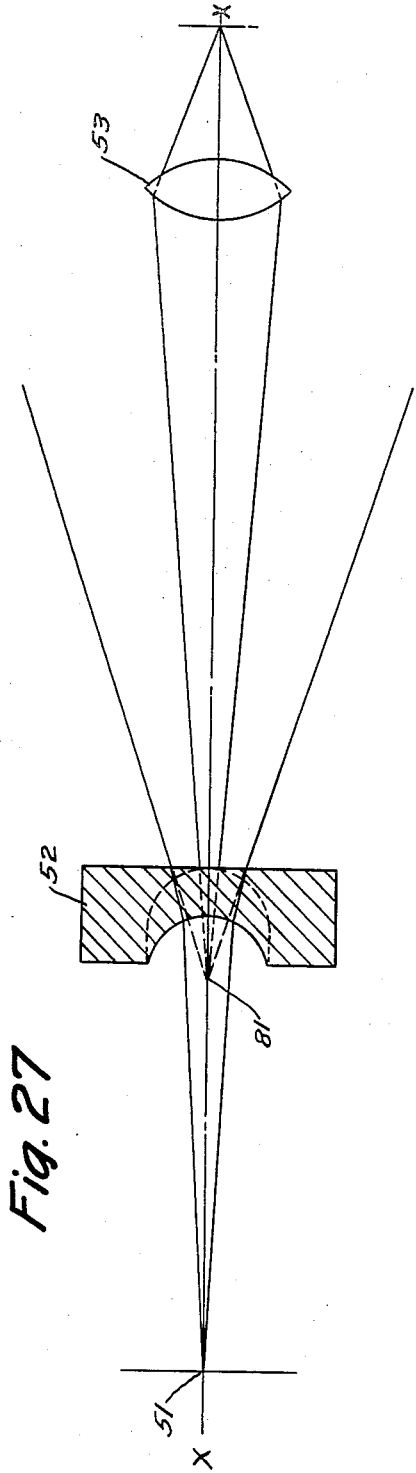
Figure 27 shows a side elevation of the optical system from light source filament 51 to the focal plane of projection or objective lens; a cross-sectional view is shown of the toric element 52, through the optical axis and in a vertical plane parallel to optical axis $x$—$x$.

Figure 29 shows a typical casing in which the lens may be mounted and used.

In the drawings the device is shown as it may be made, wherein the toric surface is referred to by the letter T in all of the different designs, and in the design shown in Figure 1 this consists of a transparent glass body 30 upon one face 31 of which is ground and polished the toric surface consisting of a concave cylindrical component of relatively small radius which is ground and polished upon a convex cylindrical surface as indicated by the numeral 31 and the axes of the convex and concave components are in planes which are mutually perpendicular. The opposite face 32 of the element is plane.

Figure 1 shows a perspective view of a toric element. It is made of transparent glass, which may be optical glass of any convenient refractive index. Since it is a single element, it may be constructed of cheap crown glass. The optical surface or face T is a toric surface composed of a negative curvature ground and polished into a positive curvature, their axes being disposed at right angles.

The concave component may be of from approximately .025" radius to approximately .5" radius, and in conjunction with the objective lens or object lens system determines the thickness of the image of the light source at the focus, or focal plane of the system.

The convex component may be from approximately .5" radius to 3.00" or 4.00" radius, and in combination with object lens, determines the length of the image of the light source at the focal point or focal plane of the system. The radius of curvature of the convex component may be of dimensions up to, but not including, infinity.

As can readily be seen, the shape of the image of a light source may be completely controlled and anticipated, the length and thickness being determined independently by changing the ratios between the convex and concave components of the toric surface, and in conjunction with a suitable objective lens, this predicted image dimension may be brought to a focus at any desirable point beyond the system.

The form of the toric element shown in Figure 1 has one toric face consisting of a convex component and a relatively small concave component ground into the convex component, the axes of the concave and convex components being disposed at 90° rotation. They are mutually perpendicular.

The face 32 opposite this toric surface is approximately plano or plane within the limits of manufacture.

In Figure 3 the two opposite optical faces have toric surfaces ground and polished in them.

In this form use is made of the otherwise plane surface to further affect the beam of light produced at focal plane of the system.

In the double toric each toric surface may be approximately of double the radius of the single to achieve the same results, and at the same time results may be achieved with the double toric which are impossible or impractical with the single toric.

Where the single toric might acquire exceedingly small dimensions due to small necessary radius of concave component to produce a very small narrow beam, this curvature may be conveniently doubled in radius when two are used "back-to-back" as the double toric Figure 3.

Also the same result may be achieved by placing two single torics, Figure 1, with their plane surfaces in contact and axes of the convex components mutually parallel, or the equivalent of having the concave axes mutually parallel.

The form shown in Figure 5 consists of a toric surface ground and polished upon one optical face and a convex cylinder with its axis parallel to the convex component of the toric surface, upon the opposite optical face.

In this arrangement, the convex cylinder upon the opposite face has the effect of reducing the focal length of the total convex curvatures of the element, without affecting the concave component.

In Figure 7 a concave cylinder with its axis 90° rotated from the axis of the convex component of the toric face has been ground and polished upon the optical face opposite the toric face. In this form, the focal length of the concave component of the entire lens body is changed, without affecting the focal length of the convex component.

In Figure 9 the concave cylindrical surface $z$, ground and polished in the surface opposite the toric surface, has its axis parallel to the convex component of the toric. Then in a direction parallel to the mutually parallel axes of the convex component of the toric on one face, and the concave cylinder upon the opposite face, the system is equivalent to a meniscus cylinder. The purpose of this form of the toric element is to be able to correct it for spherical aberration.

In this form the concave component of the toric surface T is unaffected.

In Figure 11 the convex cylindrical surface W shown in all views in Figure 12, has its axis 90° rotated from the axis of the convex component of the toric surface. Therefore, its axis is essentially parallel to the concave component of the toric surface. Then the concave component of the toric surface with the convex cylindrical surface on the opposite face forms a meniscus cylinder, and may be corrected for spherical aberration in a direction parallel to the axes of the mutually parallel axes of the concave components of the toric surface, and the convex cylinder in the opposite face.

In Figure 13 the axis of the concave component of the toric surface $T^1$ is disposed parallel to the axis of the convex component of the toric surface T, while the axis of the convex component of toric surface $T^1$ is disposed parallel to the concave component of the toric surface T.

The purpose of the toric element shown in Figure 13 is to correct for spherical aberration in both directions, parallel to the axis of the concave component of toric surface T, as well as in a direction parallel to the convex component of toric surface T.

In Figure 15 is shown a possible form wherein a spherical surface is ground upon the face opposite the toric surface.

This spherical face, $s$, Figure 15 would aid in correcting the system for spherical aberration in a direction parallel to the concave component of the toric surface, but would only decrease the focal length of the system in a direction parallel to the concave component of toric surface.

In Figure 15 is shown an element of circular cross section in a plane parallel to the direction of mutual axes of the concave and convex components of the toric surface.

Without departing from the spirit of the invention, this cross section may be of any convenient shape, such as round, square, oblong, etc.

In Figure 17 a toric surface is shown on each optical face and is the same optically, as the toric element shown in Figure 3 except that it is of circular cross section instead of rectangular cross section.

In the forms of the toric element as shown in Figures 1 to 14, the parts of the glass other than the actual toric surface, or surfaces, may be ground away entirely down to the boundary of the surface itself. This grinding away is done on the top and bottom. Figure 19 shows an element with the unnecessary portions ground away, and in this form may be originally manufactured from a smaller piece of glass.

A few possible forms that this toric element may assume without departing from the spirit of my invention having thus been described, I shall now describe its use in combination as shown in Figures 23 to 26, and the elements may be mounted in a casing as shown in Figure 29, in which the element is held in a casing 40 by a sleeve 41.

Figure 23:
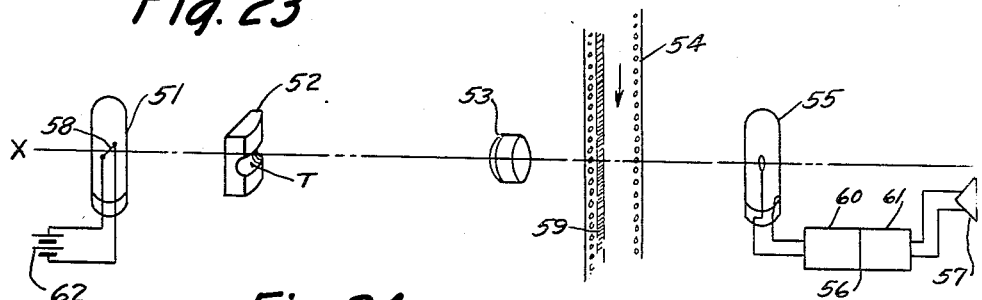
Figure 23 shows the toric lens element in combination with other elements in a system for reproducing.

In Figure 23 is shown the toric lens element in combination with other elements for the purpose of reproducing or otherwise converting into sound signals the photographed sound upon talking motion picture film.

The light source 51 may be a filament type electric lamp with its filament long relative to its thickness, with its length parallel to the axis of the concave component of the toric surface T of toric element 52, which is similar to the element 30 shown in Figure 1, however, the toric element 52 may be of a type shown in any of the Figures 1 to 20. At 53 is shown an achromatic objective lens which may be any of a number of this type. At 54 is shown a motion picture film travelling in a direction shown by the arrow, or in the opposite direction. At 55 is a light sensitive detector of a type used in sound reproduction and at 56 its accompanying preamplifier and/or audio amplifiers. At 57 is shown a loud speaker. At 59 is shown a portion of sound track.

Light from filament 58 in exciter lamp 51 proceeds in approximately 360° spherical. Due to the optical action of toric lens element 52 the light from the filament 58 in exciter lamp 51 after passing through toric element 52 is formed into a cone of light. This cone is of varying rectangular cross-section in a plane perpendicular to the optical axis of the system.

The convex component of the toric lens 52 causes the cone to converge to a focal point, where it crosses, and then diverges to infinity. The intersection of the boundary planes describes a perpendicular line, parallel to the axis of the convex component of the toric.

The concave component of the toric diverges the ray to infinity. The intersection of the boundary planes is imaginary and is on the opposite side of, or within the glass lens body, 52, and the intersection of these planes describes a line, perpendicular to the line of intersection of the boundary planes of the cone of light described by the convex component. These intersections of the respective boundary planes are mutually perpendicular. The achromatic lens 53 which is an objective lens system, is placed in such a position relative to the toric element 52 that a fine beam of light is produced upon the sound track 59 of moving film 54, the long dimension of this beam being essentially parallel to the striations of recorded sound upon the film sound track.

The convexity of the convex component of the toric is chosen to produce a beam of light which is as long as, or slightly longer than the sound track width. However, in combination, the filament length, convex component of toric element, and objective lens system, are three independent variables which control the length of the image upon the film.

The concavity of the concave component of the toric is chosen to produce a beam of light at the film sound track, of any desirable small dimension such as .0005″. This dimension might be chosen as small as .0001″ or as large as .002″ according to the purpose. However, in combination, the thickness or width of the beam at the sound track depends upon the three independent variables, light source (thickness of filament), the concave component of the toric element, and the objective lens system.

The dimensions of the filament 58 being chosen, the dimensions of the image of the filament upon a sound track 59 are controlled by the toric element 52 and objective lens system 53.

The dimensions of the filament 58 being chosen and the power of the objective lens system 53 being chosen, the dimensions of the image of said filament 58 upon sound track 59 of film 54 are controlled entirely by selection of curvatures for the convex and concave components of the toric element 52.

In a practical system, dimensions of filament 58 are on the order of .020″ by about ⅜″. Toric lens 52 is composed of convex curvature of about ¾″ radius, and concave curvature of about ⅛″ radius. Objective lens system has a focal length of about ¼″.

Since it can readily be appreciated that there is a great variation in various filament dimensions, and the dimensions of radii of curvature of both the convex and concave components of the toric can be varied within wide limits in combination with many focal lengths of different objective lens systems, the above actual dimensions can be varied widely without departing from the spirit of my invention.

The beam of light produced at the sound track 59 of moving film 54 passes through transparency of the film on to the light sensitive detector 55. According to the darkness or lightness (optical density) of the striations upon the sound track 59 through which the beam of light passes, the electrical stresses of the light sensitive detector system, including a photo-electric cell or other photo-sensitive device 55, its accompanying vacuum tube pre-amplifier 60, and/or a main audio amplifier 61 and a loud speaking telephone or loud speaker 57 are changed, thus translating the striation density into sound impulses.

The sound track 59 upon moving film 54 may have been produced by a number of recording methods including the variable area, and the variable density methods.

The light sensitive detector 55 may be any of a number of such devices available such as caesium, potassium, sodium, photo-electric cells; selenium or copper oxide cells, etc. The pre-amplifier 60 of amplifying system 56 may be eliminated if the output level of the light sensitive cell 55 is high enough to be operatable with an audio amplifier 61 alone.

The loud speaker 57 may be any one of a number of such devices and may also consist of several such devices in series or parallel, using well-known coupling systems.

A battery 62 is shown to supply voltage to filament 58 in light source 51. This may be of any convenient voltage to match voltage rating of the filament 58 or it may be varied above and below normal filament rating by means of a rheostat or potentiometer as in common practice. The battery may be replaced entirely by a power unit such as a transformer or power supply devices, as generator or battery eliminator to be operated from A. C. or D. C. light mains.

A condenser lens, not shown in Figure 23, may be situated between light source 51 and toric element 52 for the purpose of collecting more available light, and may be of the common plano-spherical, double spherical, or meniscus type; or it may be a convex cylinder, its axis parallel to the axis of the convex component of the toric lens element 52.

However, since the convex component of the toric element 52 may be changed to include the focal length of a condenser lens system at the point above-mentioned, between light source 51 and toric element 52, I have omitted it as being ambiguous and unnecessary.

Figure 24:
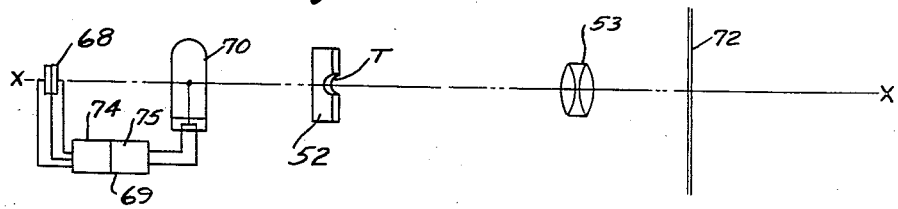
Figure 24 shows the element in a system for recording.

In Figure 24 is shown a diagrammatic representation of the toric element 52 used in recording apparatus.

Sound waves impinge upon a microphone 68 and are amplified electrically by microphone amplifier system 69 consisting of a pre-amplifier 74 and an audio amplifier 75. These electrical impulse changes are fed to a light source 70 in which the intensity varies as the incoming sound waves striking microphone 68.

Part of this total luminosity which is travelling essentially 360 degrees spherical, is picked up by toric lens element 52, and after passing through this toric element 52, proceeds in the same fashion as in Figure 23. In turn part of this resulting cone of light is picked up by objective lens system 53, and is brought down to a fine line of light upon the moving film 72.

This moving film 72 is photo-sensitized with any of several emulsions known to the art, and the length of the line of light focussed thereupon determining the width of the sound track while the relative position of the film in a direction parallel to the length dimension of the line of light, determines the actual position of the sound track upon film 72.

The thickness of the line of light produced upon the previously unexposed film 72 determines the frequency response of the system, this response varying inversely as the thickness of the beam of light produced, and directly as the film speed.

When this previously unexposed film 72 has been exposed, developed and printed in the customary manner, it is ready for reproduction.

Figure 25:
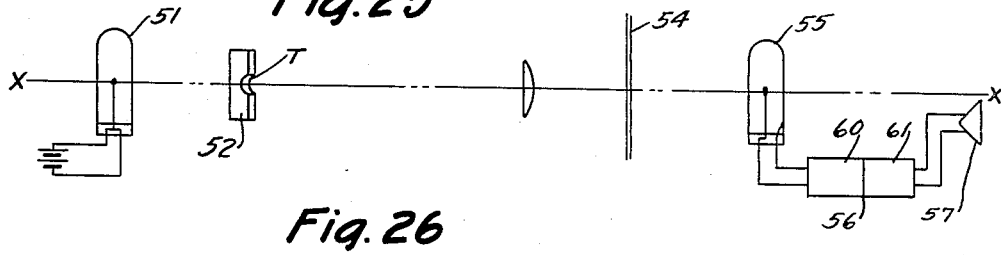
Figure 25 shows the element in a system for reproducing showing a single objective or projection lens.

In Figure 25 is shown the toric lens element 52 in a very simple form. In this simple form the light from light source 51 traverses a maximum of four optical faces before arriving at a focus in the plane of the moving film 54.

In Figure 23 there are eight optical faces to be encountered, six of them in the achromatic lens system 53. This number of optical faces may be reduced to six by using a double lens instead of a triple lens at 53.

In Figure 24, eight optical surfaces are shown, but this number can be reduced to six optical faces as before shown.

Figure 26:
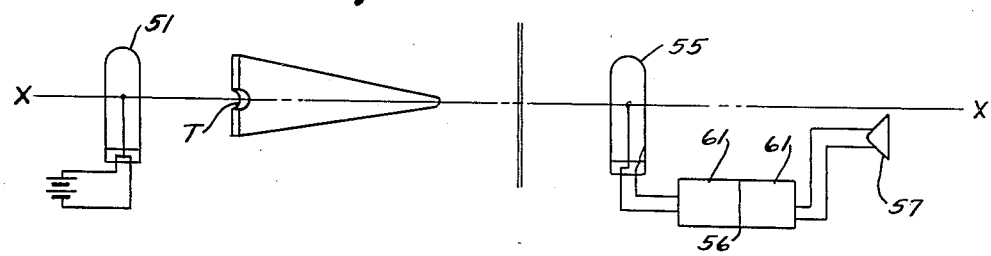
Figure 26 shows a similar system with a modification of the lens shown in Figure 21 shown therein.

In Figure 26 only two faces are shown and the system is not corrected achromatically.

In Figure 26 is shown a toric lens element essentially the same as that shown in Figure 15, the only difference, optically, being in the optical thickness of the lens body.

Having thus fully described the invention, what I claim as new and desire to secure by Letters Patent, is:

1. Apparatus for recording sound upon talking motion picture film comprising a variable light source, varied according to a sound signal; a combination toric lens element situated beyond said light source, said combination toric lens having upon one optical face, a concave cylindrical surface ground and polished upon a convex cylindrical surface, the concave cylindrical component having a radius of curvature of from approximately $r=.025''$ to $r=.5''$ and the convex cylindrical component having a radius of curvature of from approximately $r=.5''$ to $r<\infty$ ($r=$less than infinity) the axis of the concave cylindrical component being 90 degrees rotated from the axis of the convex cylindrical component, the opposite optical face having ground and polished upon its surface a similar toric surface in which the axis of the convex component is parallel to the convex component on the first mentioned optical surface; an objective lens or lens system; a motion picture film of a type used in sound photography, and a means for moving said film at an approximately uniform rate.

2. Apparatus as described in claim 1 for recording sound, in which the toric element consists of a toric surface upon one face of a transparent lens body and the opposite face has a similar toric surface but of different radii respectively.

3. Apparatus as described in claim 1 in which the toric element consists in combination, a toric surface as described in claim 1 upon one optical face, and a convex cylinder ground and polished upon the opposite optical face, the axis of the convex cylinder being disposed parallel to the axis of the convex component of the toric surface upon the first optical face.

4. Apparatus as described in claim 1 in which the toric element consists of, in combination, a toric surface such as described in claim 1, ground and polished onto one optical surface and a negative cylindrical surface ground and polished onto the opposite optical surface, the axes of this concave cylindrical surface, and the concave component of the toric surface being mutually parallel.

5. Apparatus as described in claim 1 in which the toric lens element has ground and polished upon one optical surface, a toric surface as described in claim 1 and upon the opposite optical surface has ground and polished, a concave cylindrical surface, its axis being disposed parallel to the convex component of the opposite toric face.

6. Apparatus as described in claim 1, in which the toric lens element consists of a toric surface ground and polished in one optical face while upon the opposite optical face is ground and polished a convex cylinder, its axis being disposed at 90 degree angle to axis of convex component of opposite toric surface.

7. Apparatus as described in claim 1 in which the toric lens body consists of a toric surface as described in claim 1 ground and polished into one optical face, and in the opposite optical face is ground and polished a toric surface, the axis of its negative component being disposed parallel to the positive component of the opposite toric surface, and the axis of its positive component being disposed parallel to the negative component of the opposite toric surface.

8. Apparatus as described in claim 1 in which the toric lens body consists of a toric surface as described in claim 1, on one optical surface, and upon the opposite optical surface has a positive spherical face.

9. In combination, apparatus for reproducing the sound track upon motion picture film comprising a light source; a lens element situated beyond and in line with said light source, said lens element having upon one face a toric surface, the negative component of said toric surface having a radius on the order of between .025″ and .5″ and the positive component of said toric surface having a radius of from .5″ up to a radius of less than but not including infinity; the opposite optical face of said lens element being plane or plano; an objective lens or lens system; a movable film upon which is recorded a sound track; the image of the light source being essentially focussed upon said sound track, the length dimension of the image being disposed parallel to the striations upon the film, that is, perpendicular to the motion of said film; a means for moving the film at a constant or approximately uniform speed; a photo-electric cell or other light sensitive device; its accompanying amplifier; a loud speaker.

10. Apparatus as described in claim 9 in which the toric lens element is constructed with a concave cylindrical surface ground and polished upon a convex cylindrical surface, and the opposite optical face having ground and polished upon its surface a similar toric surface in which the axis of convex component is parallel to the convex component on the first mentioned optical surface.

11. Apparatus as described in claim 9, in which the toric element consists of a toric surface upon one face of a transparent lens body and the opposite face has a similar toric surface but of different radii respectively.

12. Apparatus as described in claim 9, in which the toric element consists of, in combination, a toric surface as described in claim 1 upon one optical face, and a convex cylinder ground and polished upon the opposite optical face, the axis of the convex cylinder being disposed parallel to the axis of the convex component of the toric surface upon the first optical face.

13. Apparatus as described in claim 9 in which the toric element consists of, in combination, a toric surface ground and polished onto one optical surface and a negative cylindrical surface ground and polished onto the opposite optical surface, the axes of this concave cylindrical surface, and the concave component of the toric surface being mutually parallel.

14. Apparatus as described in claim 9 in which the toric lens element has ground and polished upon one optical surface, a toric surface and upon the opposite optical surface has ground and polished, a concave cylindrical surface, its axis being disposed parallel to the convex component of the opposite toric face.

15. Apparatus as described in claim 9 in which the toric lens element consists of a toric surface ground and polished in one optical face while upon the opposite optical face is ground and polished a convex cylinder, its axis being disposed at 90 degree angle to axis of convex component of opposite toric surface.

16. Apparatus as described in claim 9, in which the toric lens body consists of a toric surface ground and polished into one optical face, and in the opposite optical face is ground and polished a toric surface, the axis of its negative component being disposed parallel to the positive component of the opposite toric surface, and the axis of its positive component being disposed parallel to the negative component of the opposite toric surface.

17. Apparatus as described in claim 9, in which the toric lens body consists of a toric surface on one optical surface, and upon the opposite optical surface has a positive spherical face.

18. Apparatus as described in claim 1, in which the toric lens body consists of a toric surface, as described in claim 1, on one optical face, and a plane surface on the opposite optical face.

19. Apparatus as described in claim 9, in which the toric element consists of a toric surface upon one face of a transparent lens body, and a lens surface on the other face.

20. A lens comprising a transparent glass body, upon one face of which is ground and polished a unique toric surface, the concave cylindrical component having a radius of curvature of from approximately $r=.025''$ to $r=.5''$, and the convex cylindrical component having a radius of curvature of from approximately $r=.5''$ to $r=<\infty$ ($r=$less than infinity), the axis of the concave cylindrical component being 90° rotated from the axis of the convex cylindrical component, and the face opposite this toric surface being an optical surface.

21. A sound on film recording or reproducing system employing a lens element as described in claim 20, characterized in that said lens dimensions of a single toric optical face are adapted to be varied for the purpose of controlling independently the length dimension and thickness dimension of the image of a light source at the focal plane of the projection lens or objective.

22. Apparatus as described in claim 1, characterized in that a condenser lens is positioned between the light source and the toric lens element.

23. Apparatus as described in claim 9, characterized in that a condenser lens is positioned between the light source and the toric lens element.

KING ROSS.